(12) United States Patent
Murphy et al.

(10) Patent No.: US 7,277,517 B1
(45) Date of Patent: Oct. 2, 2007

(54) METHOD FOR ACHIEVING SYMBOL ALIGNMENT TO A PRE-EXISTING ADSL DATA EXCHANGE

(75) Inventors: Timothy F. Murphy, Ramona, CA (US); Martin Staszak, Poway, CA (US)

(73) Assignee: 3Com Corporation, Marlborough, MA (US)

( * ) Notice: Subject to any disclaimer, the term of this patent is extended or adjusted under 35 U.S.C. 154(b) by 741 days.

(21) Appl. No.: 10/298,130

(22) Filed: Nov. 15, 2002

(51) Int. Cl.
*H04L 7/00* (2006.01)
*H04L 25/00* (2006.01)
*H04L 25/40* (2006.01)

(52) U.S. Cl. .................................. 375/371
(58) Field of Classification Search ............... 375/371, 375/355, 376, 222, 362; 370/203, 208, 509, 370/420, 503, 516
See application file for complete search history.

(56) References Cited

U.S. PATENT DOCUMENTS

| | | | | |
|---|---|---|---|---|
| 5,511,097 A | * | 4/1996 | Tsumura | 375/324 |
| 5,553,098 A | * | 9/1996 | Cochran et al. | 375/324 |
| 5,602,601 A | * | 2/1997 | Kim et al. | 348/607 |
| 5,935,177 A | * | 8/1999 | Cox et al. | 701/9 |
| 5,995,568 A | | 11/1999 | Molnar et al. | 375/354 |
| 6,052,411 A | | 4/2000 | Mueller et al. | 375/222 |
| 6,088,386 A | | 7/2000 | Spruyt et al. | 375/222 |
| 6,188,669 B1 | | 2/2001 | Bellenger | 370/230 |
| 6,212,563 B1 | | 4/2001 | Beser | 709/227 |
| 6,222,851 B1 | | 4/2001 | Petry | 370/447 |
| 6,252,901 B1 | | 6/2001 | Mueller et al. | 375/222 |
| 6,263,016 B1 | | 7/2001 | Bellenger et al. | 375/222 |
| 6,320,867 B1 | | 11/2001 | Bellenger et al. | 370/420 |
| 6,353,636 B1 | | 3/2002 | Tate et al. | 375/260 |
| 6,363,128 B1 | | 3/2002 | Isaksson et al. | 375/355 |
| 6,377,683 B1 | | 4/2002 | Dobson et al. | 379/406.12 |
| 6,424,674 B1 | | 7/2002 | Linz et al. | 375/220 |
| 6,438,186 B1 | | 8/2002 | Strait | 375/354 |
| 6,456,654 B1 | | 9/2002 | Ginesi et al. | 375/229 |
| 6,470,030 B1 | * | 10/2002 | Park et al. | 370/480 |
| 6,483,869 B1 | | 11/2002 | DesJardins | 375/222 |
| 6,487,241 B1 | | 11/2002 | Cole | 375/220 |
| 6,501,791 B1 | | 12/2002 | Hwang | 375/222 |
| 6,507,585 B1 | * | 1/2003 | Dobson | 370/420 |
| 6,510,162 B1 | | 1/2003 | Fijolek et al. | 370/432 |
| 6,650,617 B1 | * | 11/2003 | Belotserkovsky et al. | 370/210 |
| 6,853,616 B1 | * | 2/2005 | Kim et al. | 370/210 |
| 6,944,122 B2 | * | 9/2005 | Shirakata et al. | 370/208 |
| 2002/0008525 A1 | | 1/2002 | Seagraves et al. | 324/500 |
| 2002/0015412 A1 | | 2/2002 | Czerwiec et al. | 370/395.6 |
| 2002/0090008 A1 | | 7/2002 | Cioffi et al. | 370/503 |
| 2002/0093989 A1 | | 7/2002 | Cioffi et al. | 370/509 |

(Continued)

OTHER PUBLICATIONS

U.S. Appl. No. 09/584,650, filed May 31, 2000, Cheng, et al.

*Primary Examiner*—Jean B. Corrielus
(74) *Attorney, Agent, or Firm*—McDonnell Beohnen Hulbert Berghoff LLP (57) ABSTRACT

A method for determining symbol boundaries in an ADSL modem, comprising receiving multi-frequency modulated signals in the time domain, wherein the multi-frequency modulated signals include a pilot signal at a pilot frequency. Performing a time-to-frequency transform on the multi-frequency modulated signals to recover the pilot signal. Iteratively computing a phase error for the pilot signal over a number of transform regions. Selecting the transform region with the lowest phase error.

15 Claims, 10 Drawing Sheets

U.S. PATENT DOCUMENTS

| | | | |
|---|---|---|---|
| 2002/0122437 A1* | 9/2002 | Cioffi et al. | 370/509 |
| 2002/1311455 | 9/2002 | Cioffi et al. | 370/503 |
| 2003/0018920 A1 | 1/2003 | Straeussnigg | 713/202 |
| 2003/0123582 A1* | 7/2003 | Kim et al. | 375/347 |
| 2003/0210646 A1* | 11/2003 | Ohseki et al. | 370/203 |
| 2004/0008618 A1* | 1/2004 | Shirakata et al. | 370/208 |

* cited by examiner

METHOD FOR ACHIEVING SYMBOL ALIGNMENT TO A PRE-EXISTING ADSL DATA EXCHANGE

FIELD OF THE INVENTION

This invention relates generally to ADSL transmission systems. More specifically, it relates to a method for symbol alignment in an ADSL transmission system.

BACKGROUND OF THE INVENTION

Asynchronous Digital Subscriber Line ("ADSL") is a technology that overcomes some of the limitations of plain old telephone service ("POTS"). A central office can connect to a customer premises via a transmission line, such as a traditional twisted-pair copper line. Once at the customer premises, the transmission line may connect to wiring within the customer premises. The customer wiring may split into more than one branch, and the branches may run to various different locations within the customer premises. ADSL devices, such as phones, computers, and other devices can connect to the customer wiring branches. Through the customer wiring, the ADSL devices can interface with the central office and engage in an ADSL session. In order to communicate with the central office using ADSL, an ADSL device establishes an ADSL session with the central office.

As part of negotiating the ADSL session, the ADSL device and the central office lock to a timing reference, such as a pilot signal generated by the central office or the ADSL device. The ADSL device and the central office communicate with each other by sending data. Bits of data are generally sent as symbols, which can be further grouped into frames. The ADSL device and the central office use the pilot signal in order to accurately determine the alignment of the symbols, thereby each other to accurately send and receive data.

In addition to the ADSL device, other devices may also be located on the customer premises. While the ADSL device and the central office engage in an ADSL session, the other devices may want to use ADSL to exchange data. For example, two other devices on the customer premises may want to use ADSL to exchange data with each other while the ADSL device and the central office continue to engage in their ADSL session.

As the other devices share common data links with the ADSL device, such as wiring within the customer premises, their communication may interfere with the session between the ADSL device and the central office. This is particularly true when the other devices are not aligned with the symbols and frames in the ADSL session, and as these other devices did not engage in the negotiation procedure for the ADSL session, they would generally not be aligned with the symbols and frames for the ADSL session. Thus, their exchange of data would not be aligned with the symbol and frames in the ADSL session, and this can cause interference with the ADSL session.

Therefore, there exists a need for an improved method for aligning symbols in a preexisting ADSL data exchange.

SUMMARY OF THE INVENTION

In an asynchronous digital subscriber line ("ADSL") system, a first device and a second device may communicate with each other in an ADSL session. The two devices may exchange data by transmitting symbols. The two devices may be aligned to a common symbol boundary, which can allow the two devices to accurately locate the endpoint of a symbol sent by the other device.

A third device may interface with the other two devices. For example, the second and third devices may be located on a customer premises. The devices may be connected to customer premises wiring, thereby allowing the third device to receive symbols sent between the first and second devices. The third device may then align to the common symbol boundary used by the first and second devices in the ADSL session. The third device may align to the common symbol boundary, for example, by performing a coarse symbol boundary adjustment and then performing a fine symbol boundary adjustment.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
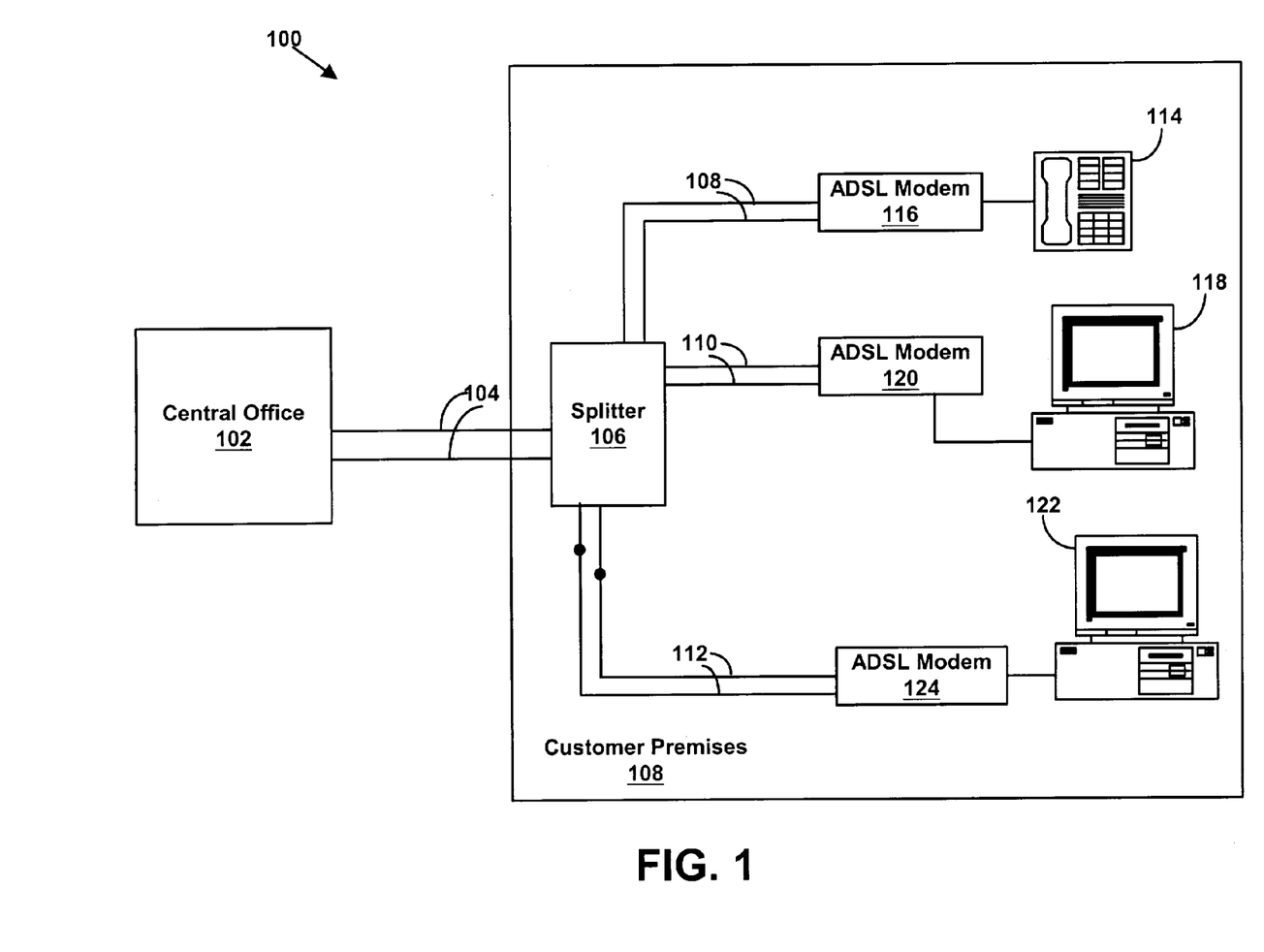
FIG. 1 is a block diagram of an ADSL system that can be used to practice the exemplary embodiments.

FIG. 1 shows an exemplary ADSL system 100 that can be used to practice the exemplary embodiments. A central office 102 connects through a transmission line 104 to a splitter 106. The transmission line 104 is ordinarily a twisted-pair copper wire transmission line, such as the type use to provide plain old telephone service ("POTS"); however, other types of wiring may also be used.

The transmission line 104 connects to the splitter 106, which is ordinarily located at the interface between the central office 102 and a customer premises 108. As shown in FIG. 1, the splitter 106 can be located inside the customer premises 108 and connected to the transmission line 104. The splitter 106 may also be located outside the customer premises 108 and connected to the transmission line 104. While the splitter 106 is generally located at the entry point of the transmission line 104 into the customer premises 108, it can also be located at various other locations. For example, the splitter 106 may be located in a device located on the customer premises 108. The splitter 106 may also be located at other locations within the ADSL system 100, and the ADSL system 100 may include more than one splitter 106.

In addition to interfacing with the central office 102 through the transmission line 104, the splitter 106 can interface with one or more devices located on the customer premises 108. The splitter 106 generally provides an interface between the transmission line 104 and various customer premises wiring links 108, 110, 112. For example, the splitter may physically split the transmission line 104 into multiple customer premises wiring links 108, 110, 112, which can then run to one or more devices located within the customer premises 108. The devices in the customer premises 108 may be, for example, ADSL devices, POTS devices or other devices. Through the customer wiring links 108, 110, 112, the devices can connect with the splitter 106 and ultimately with the central office 102.

The splitter 106 can connect to one or more ADSL devices within the customer premises 108. As illustrated in FIG. 1, the splitter 106 connects to a computer 122 over a customer wiring link 112. The connection between the splitter 106 and the computer 122 can be made through an ADSL modem 124. The ADSL modem 124 generally handles the ADSL signaling used for communication between the computer 122 and the central office 102. The ADSL modem 124 can receive signals sent over the transmission line 104, decode the signals and provide the signals to the computer 122. The ADSL modem 124 can also receive data from the computer 122, encode the data into ADSL signals and send the ADSL signals over the customer wiring link 112 and the transmission line 104 to the central office 102.

While FIG. 1 depicts the ADSL modem 124 as a separate component from the computer 122, it may alternatively be integrated into the computer 122. Of course, the computer 122 is exemplary in nature, and other ADSL devices may also be used. Other ADSL devices can also connect to the splitter 106 via customer wiring links, and these devices may be in addition to or in place of the computer 122. FIG. 1 additionally depicts a second computer 118 connected to the splitter 106. The splitter 106 connects to the second computer 118 through an ADSL modem 120 and via a customer wiring link 110.

In addition to the two computers 118, 122, an ADSL telephone 114 also connects to the splitter 106. As shown in FIG. 1, the ADSL telephone 114 connects to the splitter 106 through an ADSL modem 116 over a customer wiring link 108. Of course, as with the computers 118, 122, the ADSL modem 116 may be integrated into the ADSL telephone 116. The ADSL telephone 114 can engage in ADSL communications with the central office 102.

While FIG. 1 depicts two computers 118, 122 and a telephone 114 connected to the splitter 106, other devices may also be used. For example, fax machines, printer, computing devices or any other device capable of ADSL communication may be used. Additionally, while FIG. 1 depicts three devices 114, 118, 122 connected to the splitter 106, a greater or fewer number of ADSL devices may be connected to the splitter 106. The customer premises may additionally include one or more POTS devices, although none are shown in FIG. 1.

In the ADSL system 100, the available bandwidth can generally be divided into three ranges. One range can be used to support POTS services, while the other two frequency ranges can be used to support ADSL services. An upstream frequency range can be used for ADSL communication from the customer premises 108 to the central office 102, and a downstream frequency range can be used for ADSL communication from the central office 102 to the customer premises 108. It should be understood, however, that upstream and downstream can generally refer to communication in a first direction and a second direction.

At the physical layer, also commonly termed the line coding level, an ADSL device (e.g., the ADSL telephone 114, the computer 118 or the computer 122) and the central office 102 communicate by exchanging bits of data. Bits of data can be sent using a variety of different methods. For example, carrierless amplitude/phase modulation ("CAP"), quadrature amplitude modulation ("QAM"), discrete multitone ("DMT") or other physical layer protocols may be used to send data over the physical connection between the ADSL device and the central office 192.

DMT, which is the preferred method, generally divides the entire bandwidth into a large number of equally spaced subcarriers. In ADSL terminology, the subcarriers are commonly termed bins. For ADSL, the available bandwidth is approximately 1.1 MHz. The bandwidth is divided into subcarriers starting at 0 Hz. The subcarriers are numbered from 0-256 and thus correspond to Bins 0-256. Each subcarrier has a bandwidth of approximately 4.3125 KHz, with a guardband between the subcarriers. Each subcarrier is may be used to carry a different tone.

Of course, these values are merely exemplary in nature, and various ADSL implementations may use different bandwidths and/or subcarriers. For example, the ADSL G.lite implementation uses a smaller bandwidth. It additionally uses a smaller number of subcarriers. Other ADSL implementation may have other variations.

The bins are generally used to send data between the ADSL device and the central office, with some exceptions. For example, Bin 0 generally carries direct current that is present on the loop between the central office and the ADSL device, and therefore it is not used to send data. Bin 256 is also not used to send data, because it is at the Nyquist frequency and generally cannot be modulated to carry data. Also, Bin 64 is used to carry the pilot tone, and is therefore also not used to carry data. The pilot tone, which will be described in more detail later, may be used to synchronize the central office 102 and the ADSL device in order to allow them to accurate send and receive bits. The other bins used to transmit data are generally allocated among the three frequency ranges (i.e., POTS, upstream and downstream). These bin assignment generally depending on the specific ADSL implementation and may vary in different implementations.

The bits sent between the ADSL device and the central office 102 are generally organized into frames, and the frames may be further grouped into superframes. A superframe is generally a collection of 68 ADSL frames, although the size of a superframe may vary. In a superframe, some frames may carry error control information, indicator bits, synchronization information and/or other control information. The remaining frames may carry data between the ADSL device and the central office 102. Each frame may further include fast data bits and interleaved bits.

Of course, it should be understood that the preceding description was of a preferred embodiment in accordance with current ADSL standards. It would be possible, however, to implement ADSL using different signaling methods, framing methods, bandwidths, bin assignment or other changes. ADSL signaling is described in more detail in the American National Standard Institute ("ANSI") T1.413-1998 ADSL specification, the International Telecommunications Union ("ITU") G.922.1 full-rate ADSL recommendation, and the ITU G.992.2 G.lite ADSL recommendation, each of which is incorporated herein by reference in its entirety.

In order for an ADSL device, such as one on the customer premises 108, to engage in ADSL communications with the central office 102, the ADSL device establishes an ADSL session with the central office 102. As part of establishing the ADSL session, the ADSL device and the central office 102 can synchronize to a common timing reference, such as one produced by the central office 102 or the ADSL device. In addition to synchronizing with the timing reference, the ADSL device and the central office 102 can also align the ADSL frames and superframes. Thus, the ADSL device and the central office 102 both agree on a starting point for the frames and superframes, which allows them to accurately receive the frames and superframes sent by the other.

Other devices on the customer premises 108 would not necessarily be locked to the timing reference used by the ADSL device and the central office 102, although they may subsequently lock to the timing reference. Even after locking to the timing reference, the other device would not generally know the starting point of the ADSL symbols, frames or superframes used in the ADSL session. If these other devices then attempted to send data over the same lines used by the ADSL device and the central office 102, such as the wiring within the customer premises, their transmissions may interfere with the signaling between the ADSL device and the central office 102.

For example, the ADSL phone 114 may engage in an ADSL session with the central office 102. If the computers 118, 112 then attempted to exchange data with each other via the wiring within the customer premises 108, their signals on the customer premises wiring may interfere with the data sent between the ADSL device and the central office 102. This affect may be particularly noticeable when the computers 118, 122 send symbols that are not aligned with the symbols and frames used by the ADSL telephone 114 and the central office 102. In order to reduce this interference, the computers 118, 122 may first align their symbols with the symbols used by the ADSL phone 114 and the central office 102. Then, with their symbols aligned, the computers 118, 122 may communicate with each other with only minimal, if any, interference with the ADSL session between the ADSL phone 114 and the central office 102. Of course, there are other reasons for aligning symbols with another devices.

It should be understood that while the preceding and subsequent discussions describe the ADSL telephone 114 communicating with the central office 102 and the computers 118, 122 communicating with each other, this selection is merely arbitrary. Any device on the customer premises 108 may communicate with the central office 102, while any two other devices may communicate with each other. Also, the devices are not limited to computers and phones, and other types of devices may also be used. Additionally, the reference points may be reversed such that one device on the customer premises 108 communicates with the central office 102, while two devices at the central office 102 then communicate with each other. Of course, the devices may also be located at other locations, such as at any other location connected to the customer premises 108 or the central office 102.

Figure 2:
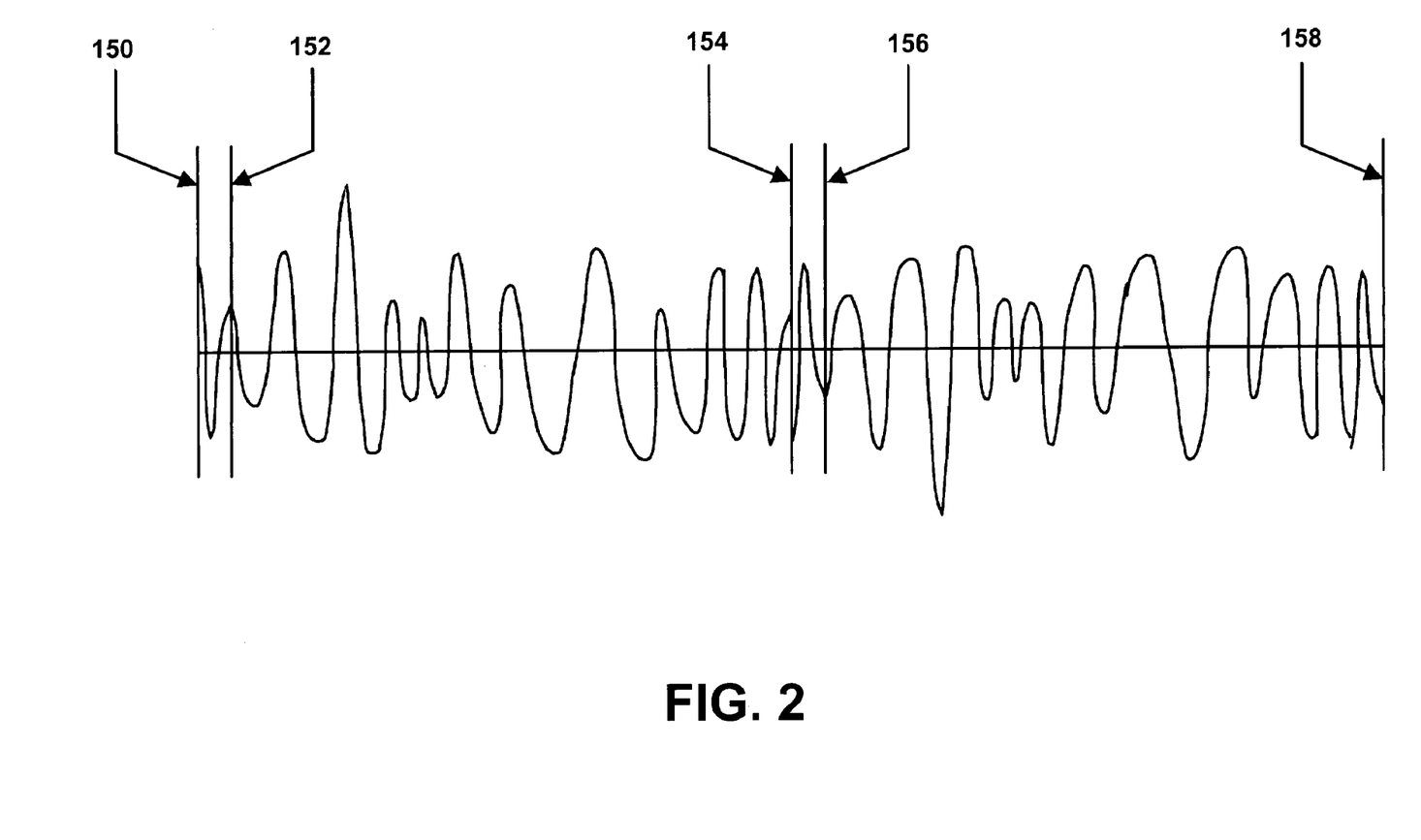
FIG. 2 is an illustration of an exemplary ADSL symbol in the time domain.

FIG. 2 is an illustration of exemplary ADSL symbols in the time domain. The ADSL symbols may be, for example, transmitted between the ADSL telephone 114 and the central office 102 during their ADSL session. As the symbols may be transmitted over the customer premises wiring, which is electrically connected with the computers 118, 122, the computers 118, 122 may also be able to receive and read the ADSL symbols. Of course, it should be understood that FIG. 2 depicts the two ADSL symbols over a discrete time interval, and the central office 102 and the ADSL telephone 114 may exchange a greater number of symbols over a longer period of time.

In FIG. 2, a Prefix Beginning 150 and a Prefix Ending 152 bound a prefix for a first DMT symbol. In order to accommodate removing channel distortion with a circular deconvolution of the symbol at the receiver, the last $\frac{1}{16}$th of the symbol is added to the beginning of the symbol as a prefix. The first DMT symbol thus lies between the Prefix Ending 152 and a Symbol Boundary 154. Similarly, the first DMT symbol including the prefix lies between the Prefix Beginning 150 and the Symbol Boundary 154. At the Symbol Boundary 154, a prefix for a second DMT symbol begins. At the Symbol Boundary 154, however, a discontinuity occurs between the first DMT symbol and the second DMT symbol due to the change in phase and tone between the first DMT symbol and the second DMT symbol.

The prefix for the second DMT symbol lies between the Symbol Boundary 154 and a Second Prefix Ending 156. The second DMT symbol lies between the Second Prefix Ending 156 and a Second Symbol Boundary 158, and the second DMT symbol including the prefix lies between the Symbol Boundary 154 and the Second Symbol Boundary 158. Similarly, a discontinuity exists at the Second Symbol Boundary 158 between the second DMT symbol and a DMT symbol following the second DMT symbol.

As previously described, the prefix is added to the beginning of each symbol in order to accommodate removing channel distortion with circular convolution of the symbol at the receiver. Since each tone has an integer number of cycles within the symbol, continuity is preserved between the prefix and the body of the symbol. The receiver ordinarily uses the portion of the symbol outside the area affected by channel distortion to perform a Fourier transform, such as the Fast Fourier Transform ("FFT"), on the symbols. The FFT can be used to convert a time domain signal into a frequency domain signal, but other time to frequency transforms could be used as well. Once in the frequency domain, the ADSL device can recover the amplitudes and phase of individual tones that were carried in the symbol's bins.

In order to allow the computers 118, 122 to communicate with each other without interfering with the phone's ADSL session with the central office 102, the computers 118, 122 may align their symbols with those seen on the phone's side of the channel. By aligning their symbols, the computers 118, 122 can send their symbols so that the discontinuity between their symbols does not fall within a symbol transmitted by the central office 102 or the ADSL phone 114. When a discontinuity occurs within a DMT symbol, and thus falls within the FFT window of the symbol, it generates noise in all the bins. The noise in the bins can interfere, if not prevent, accurate recovery of the data in the bins. Therefore, by aligning the symbols, the discontinuity between symbols will be at approximately the same point in time as seen by the central office 102, the ADSL phone 114 and the computers 118, 122. Thus, the symbol transmission of any of these devices would have only a minimal affect on the symbol transmissions of any of the other devices.

Figure 3:
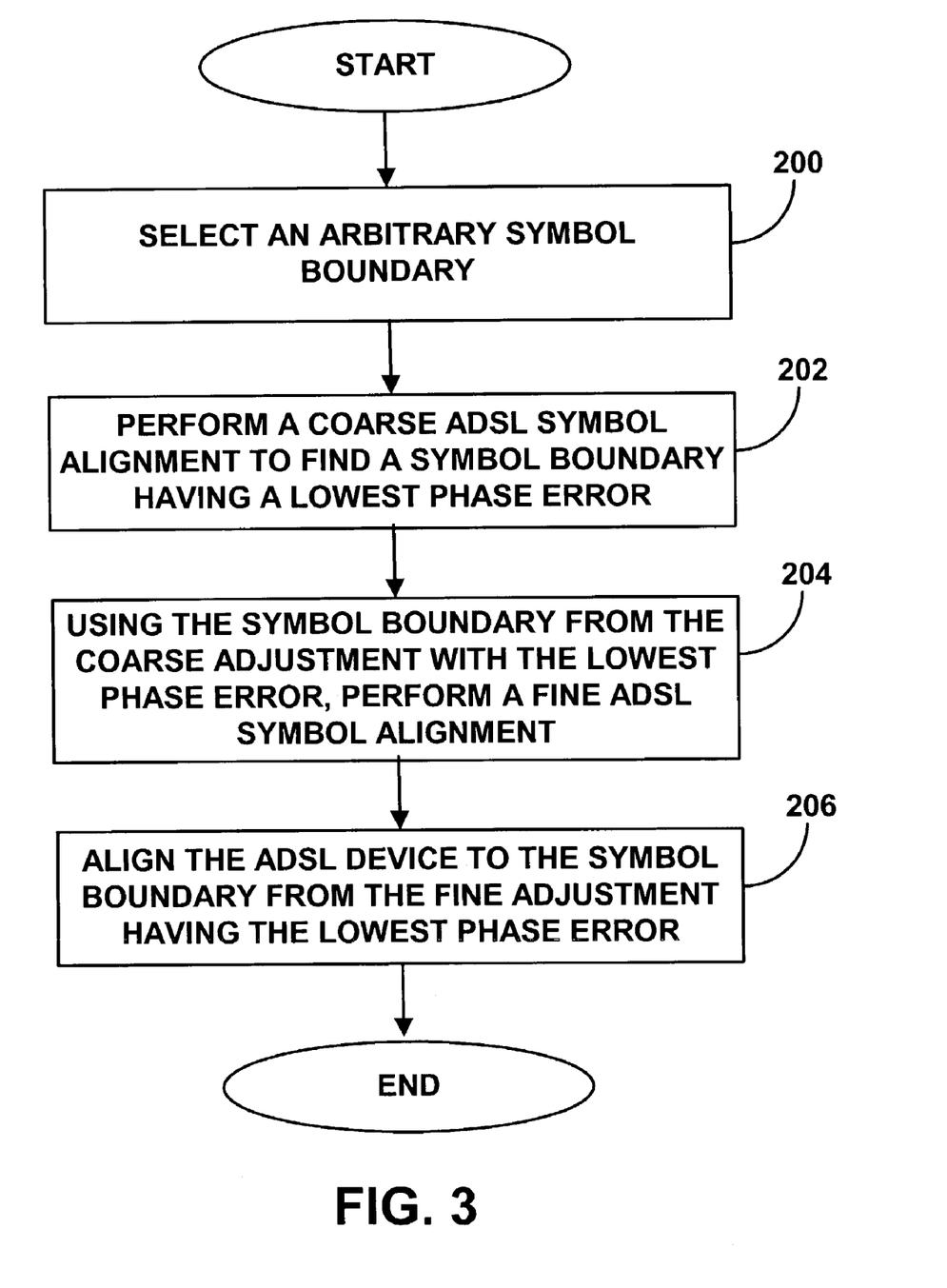
FIG. 3 is a flowchart of an exemplary process that can be used to align symbols in a preexisting ADSL data exchange.

FIG. 3 is a flowchart of an exemplary process that can be used to align symbols in a preexisting data exchange. Thus, it can be used, for example, to align an ADSL device to a symbol aligned used by two other devices in an ADSL session with each other. At Step 200, an ADSL device selects an arbitrary symbol boundary for its initial alignment. Then, at Step 202, the ADSL device performs a coarse ADSL symbol alignment to find a symbol boundary having a lowest phase error. For example, the ADSL device may increment the arbitrary symbol boundary over one period of the symbol. For each increment, the ADSL device may compute a phase error. The ADSL device may then select the symbol boundary having the lowest phase error as the coarse adjustment point. Then, at Step 204, the ADSL device uses the symbol boundary from the coarse adjustment with the lowest phase error to perform a fine ADSL symbol alignment. Thus, the ADSL device selects the symbol boundary from a course adjustment that has the lowest phase error, and it then performs a fine adjustment on that boundary to further minimize the phase error. Finally, at Step 206, the ADSL device aligns to the symbol boundary from the fine adjustment having the lowest phase error.

In order to perform a phase error calculation and to perform the symbol alignment, the ADSL device needs a reference with which to compare the received symbol. In a preferred embodiment, the ADSL device locks its local oscillator to the received pilot signal and uses the pilot signal as a reference for the phase error comparison. The pilot may be used as the reference in computing both the coarse adjustment and the fine adjustment. The ADSL device may lock to the pilot signal in a variety of different ways, for example, by using a phase locked loop ("PLL").

Figure 4:
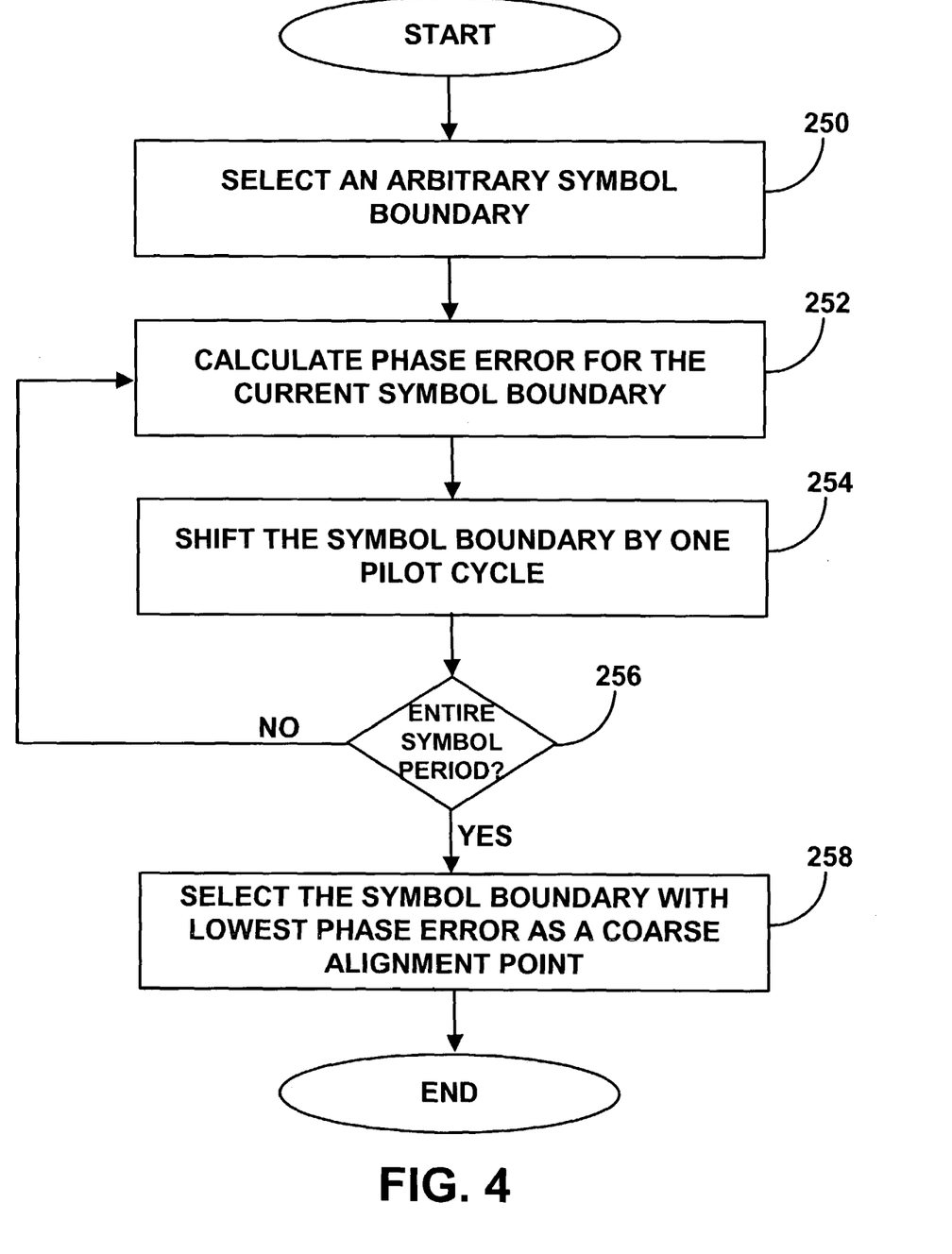
FIG. 4 is a flowchart of an exemplary process for performing a coarse ADSL symbol alignment.

FIG. 4 is a flowchart of an exemplary process for performing a coarse ADSL symbol alignment. The process depicted in FIG. 4 can be used, for example, as Step 202 in FIG. 3. With reference to FIG. 4, at Step 250, an ADSL device selects an arbitrary symbol boundary. Then, at Step 252, the ADSL device calculates a phase error for the current symbol boundary. At Step 254, the ADSL device shifts the symbol boundary by one pilot cycle. The pilot cycle provides a convenient reference for performing the iterations, because the ADSL device knows the bin location of the pilot signal and it knows the period of the pilot signal. Of course, other iteration increments may be used, and they may be greater or smaller than the pilot cycle.

Next, the ADSL device determines if it has iterated the symbol boundary for one symbol period, as shown at Step 256. If the device has not iterated through one symbol period, then it returns to Step 252 and continues calculating the phase error. If the device has iterated through one symbol period, then the ADSL devices selects the symbol boundary with the lowest phase error as the coarse alignment point, as shown at Step 258.

The ADSL device may perform the coarse adjustment in an attempt to align to the symbol boundary in a variety of different ways. For example, the ADSL device may attempt to minimize a timing error of a controlled oscillator, such as a voltage controlled oscillator ("VCO"), as it locks to the pilot signal. To set the arbitrary symbol boundary, the VCO may be locked to the pilot signal at any point. The symbol boundary can then be adjusted, for example, by modifying a read pointer of an analog-to-digital converter ("A/D") that is used to read in values from the analog transmission line. The read pointer may be adjusted by incrementing or decrementing the read pointer, but in a preferred embodiment the read pointer is decremented. Using the read pointer to adjust the symbol boundary can advantageously allow the symbol boundary to shift for integer multiples of the pilot signal while allowing the pilot reference to remain unchanged. Of course, alternate embodiments may shift the symbol boundary by adjusting the VCO, adjusting the read pointer, performing signal processing computations in hardware and/or software, and/or perform a combination of these or different operations. These techniques can similarly be used to shift the symbol boundary during the process for performing fine adjustments.

Figure 5:
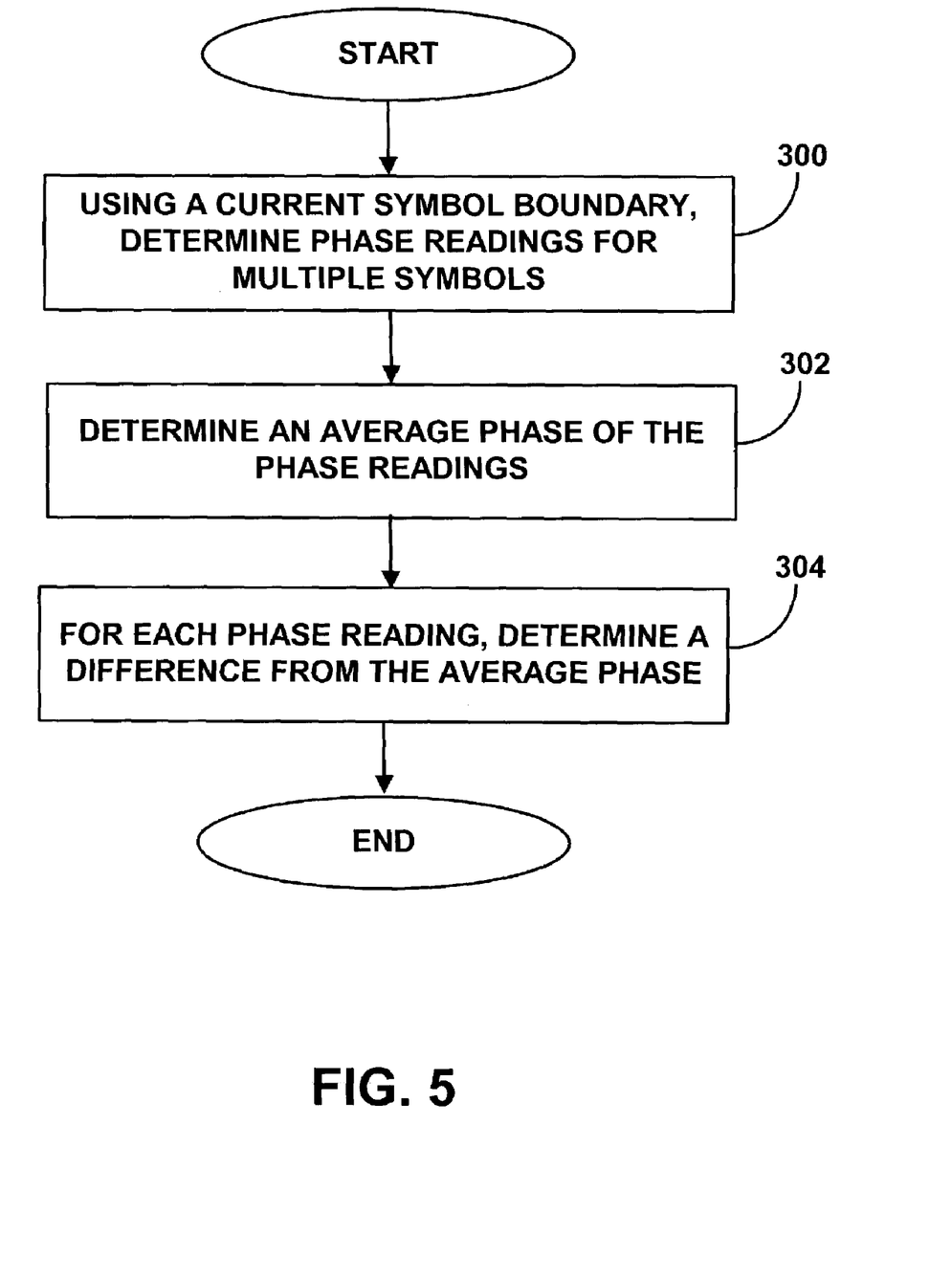
FIG. 5 is a flowchart of an exemplary process for calculating a phase error for a current symbol boundary.

FIG. 5 is a flowchart of an exemplary process for calculating a phase error for a current symbol boundary. The process depicted in FIG. 5 can be used, for example, as Step 252 of FIG. 4. Using the current symbol boundary, the ADSL device determines phase readings for multiple symbols. For example, the ADSL device can use the symbol boundary to read multiple symbols, and for each of the symbols the ADSL device can determine a phase. Then, at Step 302, the ADSL device determines an average of the phase readings. At Step 304, for each phase reading, the ADSL device determines a difference from the average phase. For example, the ADSL device can subtract each phase reading from the average phase. Additionally, the ADSL device may compute the magnitude of the difference. Using the differences, the ADSL device can determine the symbol boundary corresponding to the phase difference having the lowest magnitude.

Of course, it should be understood that the process depicted in FIG. 5 is merely an example of a method for computing a phase error. Many other ways exist to compute an error measurement or to compute a deviation from an expected value. The techniques, or others, may also be used to compute a phase error.

Figure 6:
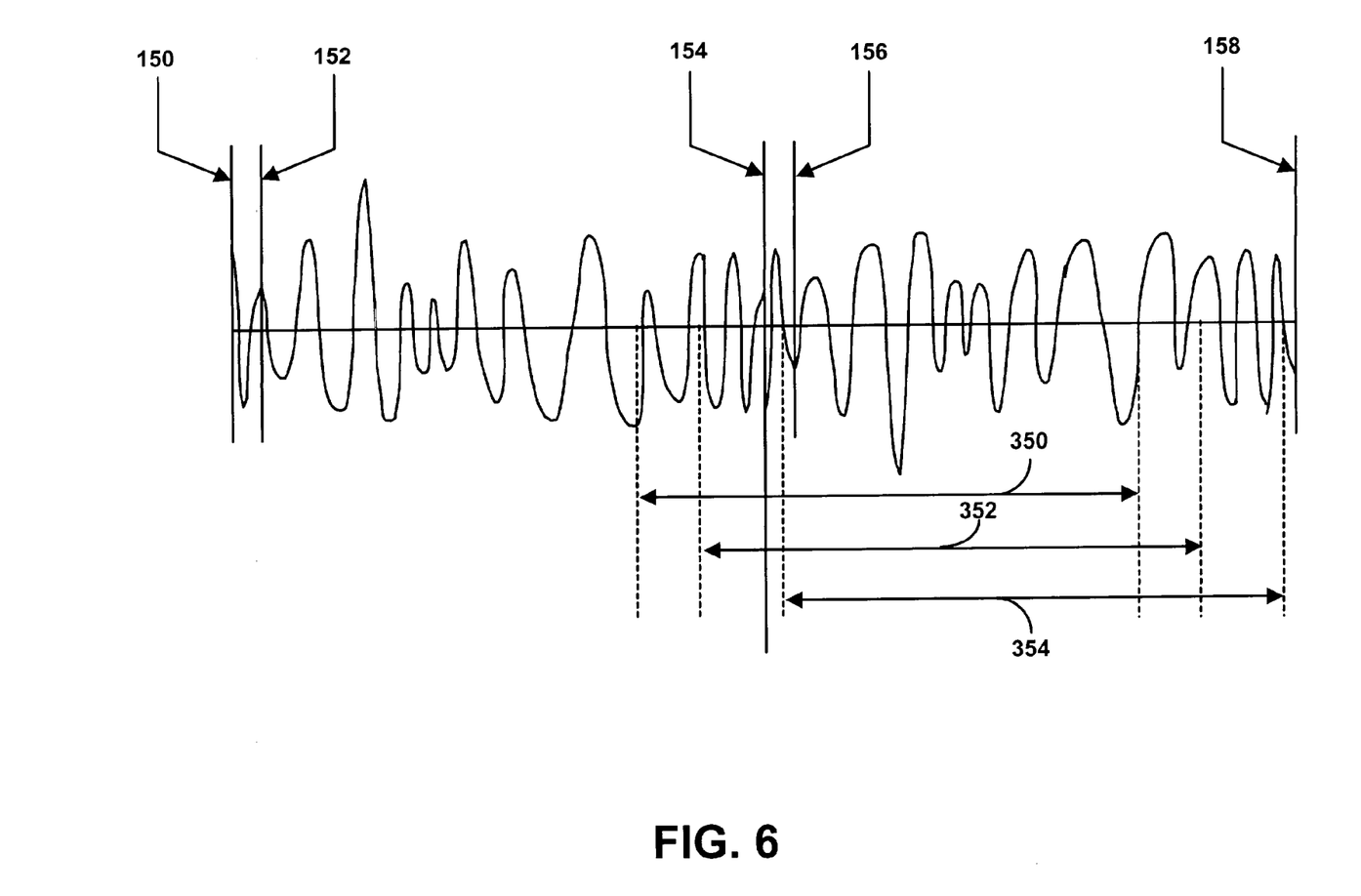
FIG. 6 is a graphical representation of symbol boundary iterations for a coarse ADSL symbol boundary alignment.

FIG. 6 is a graphical representation of symbol boundary iterations for a coarse ADSL symbol boundary alignment, such as can be performed using the process described in FIG. 4. As previously described, the ADSL device can begin by selecting an arbitrary symbol boundary and then adjusting the symbol boundary through one symbol period. FIG. 4 depicts three examples of iterations for the coarse adjustment. A first symbol boundary alignment, shown at 350, and a second symbol boundary alignment, shown at 352, are two example iterations. Each of these two alignments represents a different DMT symbol for the respective alignment. As shown in FIG. 5, the DMT symbol for each of these two alignments includes the discontinuity between the first and second DMT symbols, which occurs at the Symbol Boundary 154.

The discontinuity will generally introduce a large phase error. Thus each iteration of the symbol alignment whose DMT symbol includes the discontinuity will have a large phase error due to the noise introduced in the bins by the discontinuity. The phase error will generally be at its lowest value for the symbol boundary position that does not include the discontinuity, which in this case is illustrated at 354. In a preferred embodiment, the coarse symbol boundary adjustment is set to one pilot signal so that for one set of iterations across an entire symbol, at least one iteration will not include the discontinuity. For an iteration that does not include the discontinuity, its phase error will generally be significantly lower than iterations that include in the discontinuity in the FFT transform region.

For the iteration having the lowest phase error, one of endpoints of the corresponding DMT symbol will generally lie within the prefix. However, it is possible that one of the endpoints may align with the discontinuity or with the Symbol Boundary 154. Although the coarse adjustment iteration having the lowest phase error may have one of its symbol endpoints within the prefix does not necessarily result in the symbol alignment having the lowest phase error.

As previously described, ADSL device may perform a circular convolution of the DMT symbol in order to reduce channel distortion. Thus, channel distortion may occur in the prefix region. This can adversely affect the phase error of DMT signals that are aligned to begin or end within the prefix region. Thus, the preferred alignment is such that the DMT signals begin at the Symbol Boundary 154. In order to further minimize the phase error, a fine ADSL symbol alignment may be performed, although it may also be possible to simply use the coarse adjustment as the final symbol alignment without further performing a fine ADSL symbol alignment.

Figure 7:
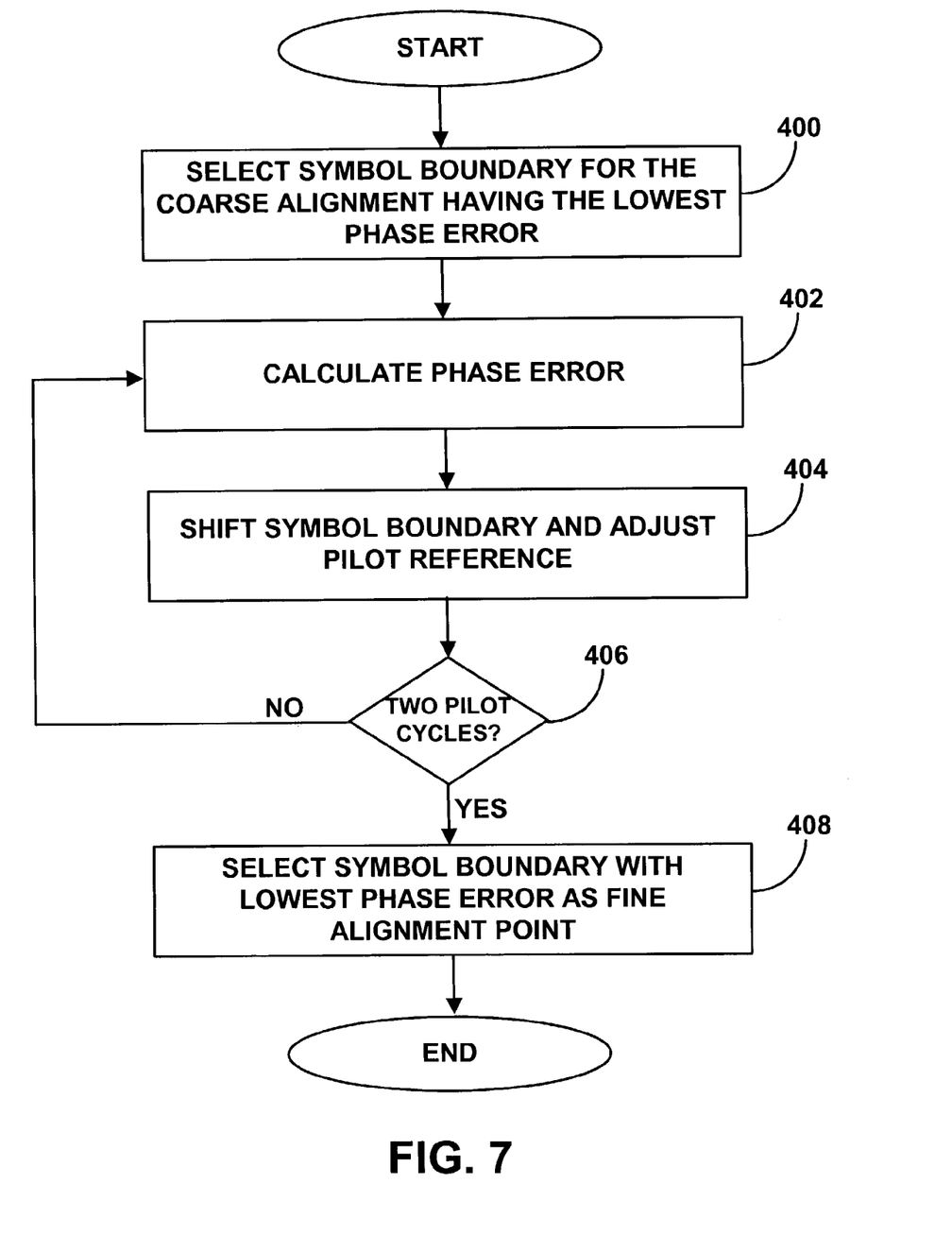
FIG. 7 is a flowchart of an exemplary process for performing a fine ADSL symbol alignment.

FIG. 7 is a flowchart of an exemplary process for performing a fine ADSL symbol alignment. At Step 400, the ADSL device selects the symbol boundary for the coarse alignment having the lowest phase error. At Step 402, the ADSL device calculates the phase error for the symbol alignment. This may be done, for example, using the process depicted in FIG. 5. Of course, since the ADSL device previously calculated the phase error for this alignment, the ADSL device may forego the computation of the phase error for this symbol boundary and use the previously calculated value.

At Step 404, the ADSL device shifts the symbol boundary and adjusts the pilot reference. For example, the symbol boundary may be iterated by an integer sub-multiple of a pilot cycle, such as 1 or 2 samples of the A/D converter used to read in the DMT signals from the analog transmission line. In a preferred embodiment, the pilot reference is adjusted by 360 degrees times the integer sub-multiple and then divided by the number of ADC samples per pilot cycle, and the iterations are performed over two pilot cycles. Of course, other iterations may be used, and they may provide a greater or fewer number of iterations per pilot cycle. Additionally, the iterations may be performed over a greater or fewer number of pilot cycles, or they may be performed over another reference period. Of course, the symbol boundary and/or the pilot reference adjustments may be made in hardware, software or a combination of both. In an alternate embodiment, either the symbol boundary or the pilot reference may be adjusted instead of adjusting both as was previously described.

At Step 406, the ADSL device determines if it has performed the iterations over two pilot cycles. If it has not performed the iterations over two pilot cycles, then it returns to Step 402 in order to calculate the phase error for the current symbol boundary. If it has performed the iterations over two pilot cycles, then it selects the symbol boundary with the lowest phase error as the fine alignment point, as shown at Step 408.

Generally, the phase error will be lowest at the Symbol Boundary 154, although depending on the spacing of the iteration and the calculation of the phase error, the fine alignment point may vary from the Symbol Boundary 154. Once the computers 118, 122 have aligned to the symbol boundary used by the central office 102 and the ADSL telephone 114, the computers 118, 122 may then exchange ADSL data between them without significantly interfering with the symbol transmissions between the ADSL telephone 114 and the central office.

Figure 8:
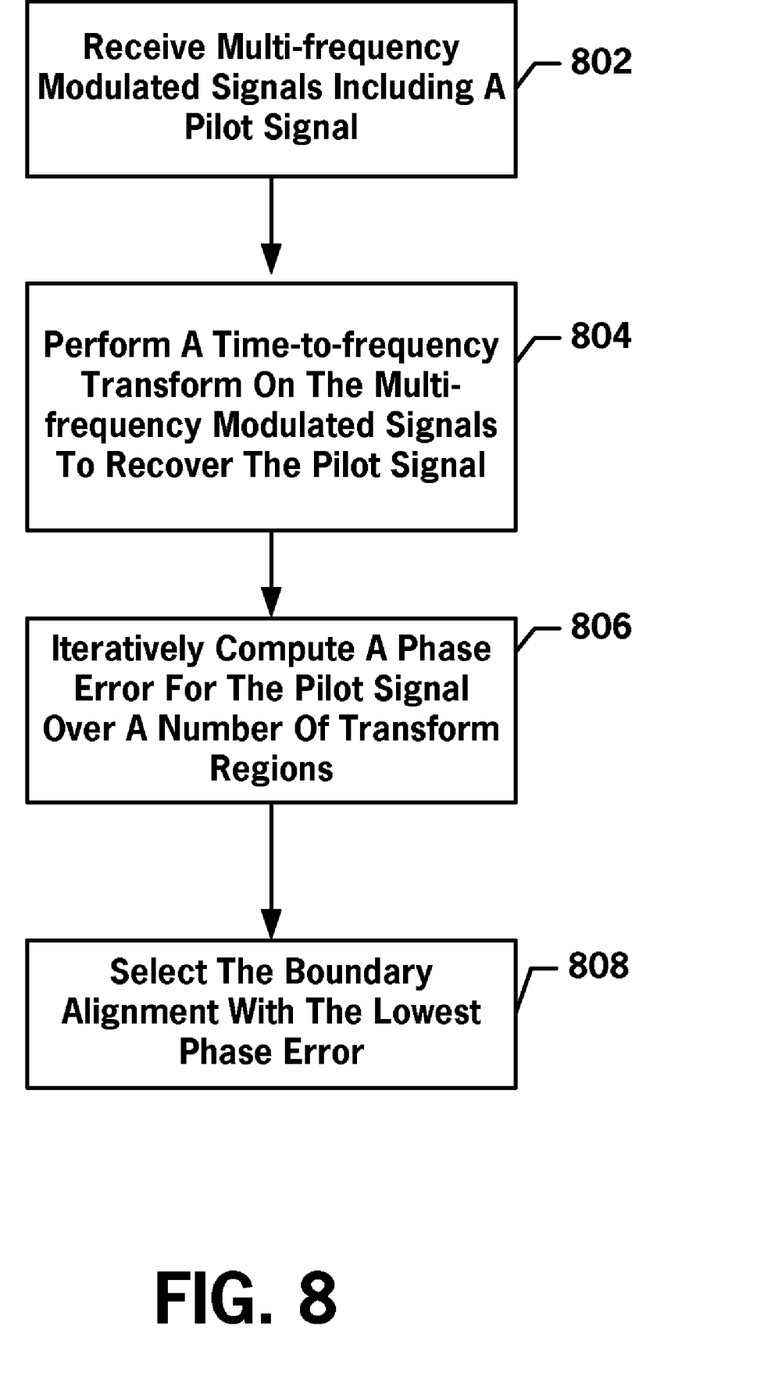
FIGS. 8-11 depict various embodiments of preferred methods of performing ADSL symbol alignment.

With respect to FIG. 8, a preferred method for determining symbol boundaries in an ADSL modem is described. At step 802, multi-frequency modulated signals are received in the time domain, wherein the multi-frequency modulated signals include a pilot signal at a pilot frequency; at step 804, a a time-to-frequency transform is performed on the multi-frequency modulated signals to recover the pilot signal; at step 806 a phase error for the pilot signal over a number of transform regions is computed; and at step 808, the symbol boundary alignment with the lowest phase error is selected.

Figure 9:
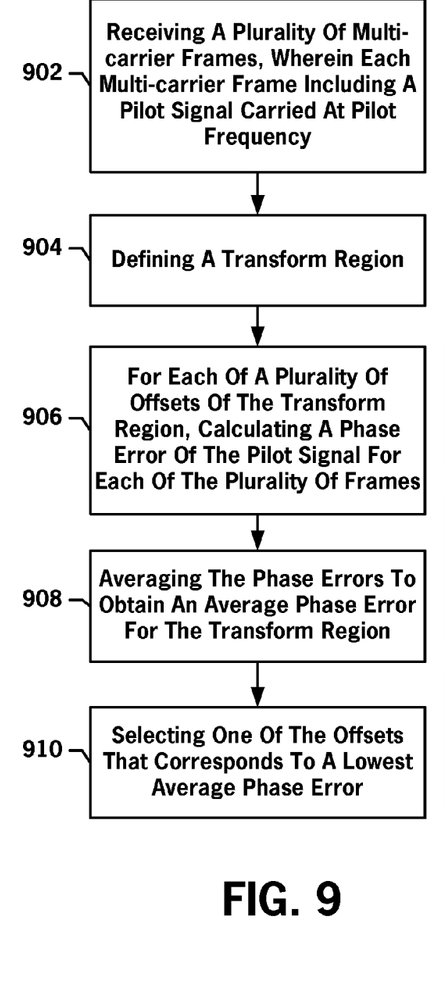

With respect to FIG. 9, an alternative preferred method for determining symbol boundaries in an ADSL modem is described. At step 902 a plurality of multi-carrier frames is received, wherein each multi-carrier frame includes a pilot signal carried at pilot frequency; at step 904 a transform region is defined; at step 906, for each of a plurality of offsets of the transform region, a phase error of the pilot signal is calculated for each of the plurality of frames, and at step 908 the phase errors are averaged to obtain an average phase error for the transform region; and at step 910, one of the offsets that corresponds to a lowest average phase error is selected.

Figure 10:
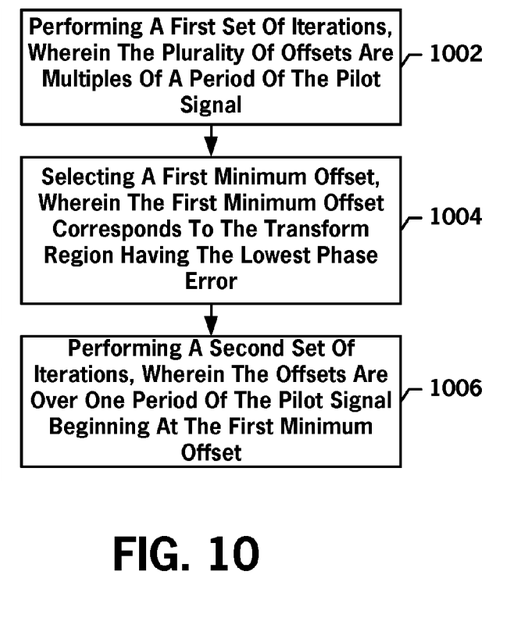

With respect to FIG. 10, certain variations of some steps of FIG. 9 will be further described. In particular, the step of calculating the phase error of the pilot signal may be performed by step 1002 performing a first set of iterations, wherein the plurality of offsets are multiples of a period of the pilot signal; and then at step 1004 selecting a first minimum offset, wherein the first minimum offset corresponds to the transform region having the lowest phase error. Furthermore, at step 1006, a second set of iterations may be performed, wherein the offsets are over one period of the pilot signal beginning at the first minimum offset.

Figure 11:
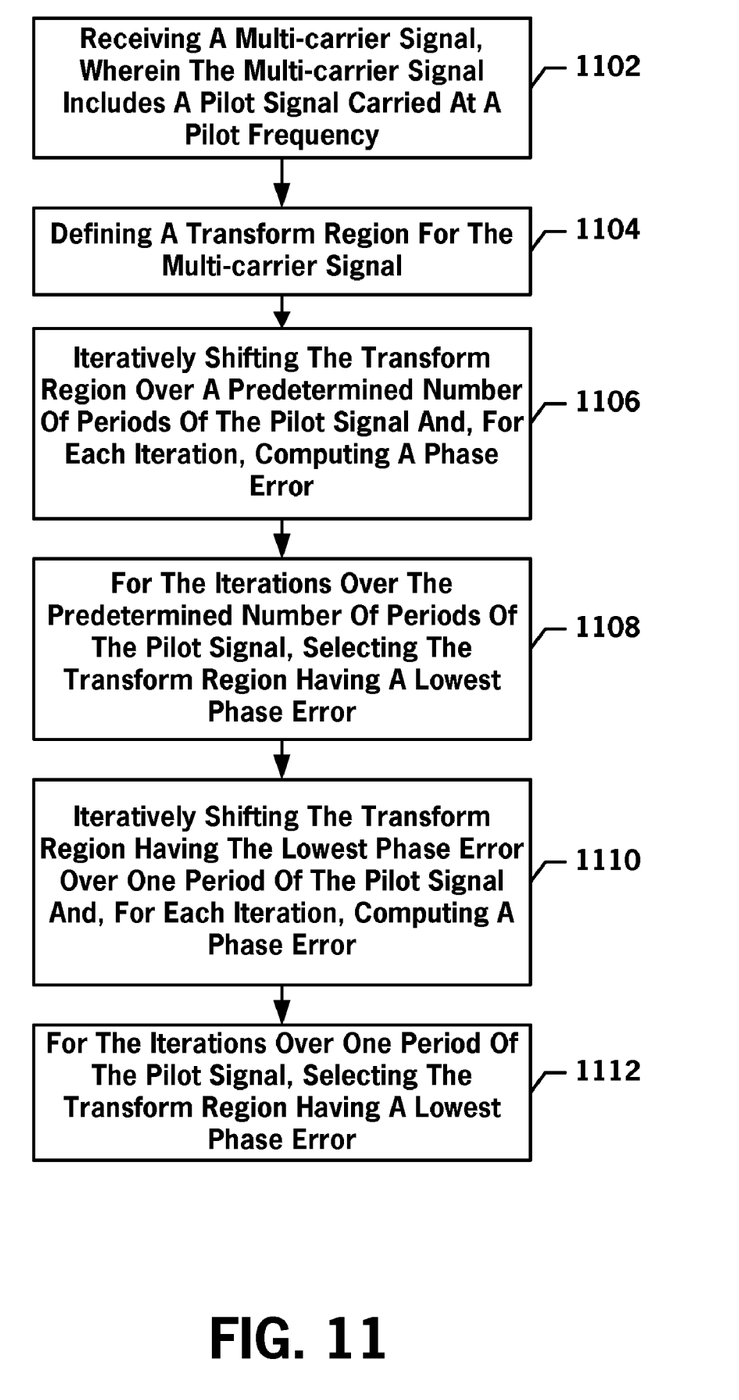

With respect to FIG. 11, a further alternative method of aligning symbols in an ADSL modem will be described. Step 1102 is receiving a multi-carrier signal, wherein the multi-carrier signal includes a pilot signal carried at a pilot frequency; step 1104 is defining a transform region for the multi-carrier signal; step 1106 is iteratively shifting the transform region over a predetermined number of periods of the pilot signal and, for each iteration, computing a phase error; step 1108 is, for the iterations over the predetermined number of periods of the pilot signal, selecting the transform region having a lowest phase error; step 1110 is iteratively shifting the transform region having the lowest phase error over one period of the pilot signal and, for each iteration, computing a phase error; and step 1112 is, for the iterations over one period of the pilot signal, selecting the transform region having a lowest phase error.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method for determining symbol boundaries in an ADSL modem, comprising:

receiving multi-frequency modulated signals in the time domain, wherein the multi-frequency modulated signals include a pilot signal at a pilot frequency;

performing a time-to-frequency transform on the multi-frequency modulated signals to recover the pilot signal;

iteratively computing a phase error for the pilot signal over a number of transform regions; and selecting the transform region with the lowest phase error.

2. A computer readable medium having stored therein instructions for causing a central processing unit to execute the method of claim 1.

3. The method of claim 1, wherein the multi-frequency modulated signals include a plurality of frames, and wherein iteratively computing the phase error for the pilot signal comprises:
   for each of the number of transform regions, computing the phase error over the plurality of frames; and
   averaging the phase errors to obtain one phase error for each of the transform regions.

4. The method of claim 1, wherein receiving multi-frequency modulated signals comprises receiving DMT signals.

5. The method of claim 1, wherein the time-to-frequency transform is a Fourier Transform.

6. The method of claim 1, wherein the time-to-frequency transform is a Fast Fourier Transform.

7. A method for achieving symbol alignment, comprising:
   receiving a plurality of multi-carrier frames, wherein each multi-carrier frame includes a pilot signal carried at pilot frequency;
   defining a transform region;
   for each of a plurality of offsets of the transform region, calculating a phase error of the pilot signal for each of the plurality of frames and averaging the phase errors to obtain an average phase error for the transform region; and
   selecting one of the offsets that corresponds to a lowest average phase error.

8. A computer readable medium having stored therein instructions for causing a central processing unit to execute the method of claim 7.

9. The method of claim 7, wherein calculating the phase error of the pilot signal comprises:
   performing a first set of iterations, wherein the plurality of offsets are multiples of a period of the pilot signal; and
   selecting a first minimum offset, wherein the first minimum offset corresponds to the transform region having the lowest phase error.

10. The method of claim 9, further comprising:
    performing a second set of iterations, wherein the offsets are over one period of the pilot signal beginning at the first minimum offset; and
    selecting a second minimum offset, wherein the second minimum offset corresponds to the transform region having the lowest phase error from the second set of iterations.

11. A method of aligning symbols in an ADSL modem, comprising:
    receiving a multi-carrier signal, wherein the multi-carrier signal includes a pilot signal carried at a pilot frequency;
    defining a transform region for the multi-carrier signal;
    iteratively shifting the transform region over a predetermined number of periods of the pilot signal and, for each iteration, computing a phase error;
    for the iterations over the predetermined number of periods of the pilot signal, selecting the transform region having a lowest phase error;
    iteratively shifting the transform region having the lowest phase error over one period of the pilot signal and, for each iteration, computing a phase error; and
    for the iterations over one period of the pilot signal, selecting the transform region having a lowest phase error.

12. A computer readable medium having stored therein instructions for causing a central processing unit to execute the method of claim 11.

13. The method of claim 9, wherein computing the phase error comprises performing a Fourier Transform.

14. The method of claim 9, wherein computing the phase error comprises performing a Fast Fourier Transform.

15. The method of claim 11, wherein the multi-carrier signal includes a plurality of frames, and wherein computing the phase error comprises:
    computing the phase error over the frames; and
    averaging the phase errors.

* * * * *